May 28, 1963 P. H. HARRER 3,091,072
TRACTOR MOWER

Filed July 8, 1960 4 Sheets-Sheet 1

Inventor
Paul H. Harrer
By Robert W. Lahtinen
Attorney

May 28, 1963 P. H. HARRER 3,091,072
TRACTOR MOWER

Filed July 8, 1960 4 Sheets-Sheet 3

Inventor
Paul H. Harrer
by Robert W. Lahtinen
Attorney

May 28, 1963

P. H. HARRER 3,091,072

TRACTOR MOWER

Filed July 8, 1960

Inventor
Paul H. Harrer
by Robert W. Lathrum
Attorney

United States Patent Office 3,091,072
Patented May 28, 1963

3,091,072
TRACTOR MOWER
Paul H. Harrer, La Porte, Ind., assignor to Allis-Chalmers Manufacturing Company, Milwaukee, Wis.
Filed July 8, 1960, Ser. No. 41,557
4 Claims. (Cl. 56—25)

This invention relates to tractor mowers and more particularly to an improved mounting for a side mounted tractor mower.

In numerous mowing operations using a laterally extending cutting device it is necessary to cut over surfaces having varying orientation and frequently the cutting mechanism must be adjusted to cut in a different plane. In so doing three adjustments must be considered: the height of the inner shoe (the raising or lowering of the entire cutting element), the raising or lowering of the outer shoe (the pivotal adjustment of the cutting mechanism about a longitudinal axis) and the tilt of the cutting element.

In most side mounting arrangements the mower is connected to the tractor in such a manner that the raising of the inner shoe and the pivoting of the cutter bar are both effected about longitudinal axes and so interrelated as to cause a change of the angular relation between the cutting mechanism and the ground upon each variation of the height of the inner shoe. This manner of connection also requires that the same sequence of adjustment be used at all times; namely, the initial adjustment of the height of the inner shoe followed by adjustment of the angle of the cutter bar. Further, it is virtually always necessary that both adjustments be made in every case. Quite frequently it is desired to cut over parallel surfaces and in such instances the adjustment would be facilitated if it were possible to make a single rather than multiple adjustments, particularly when the tractor is in motion.

Another feature that is a necessity for a commercially successful mower attachment is a design that allows a single operator to mount the mower on or detach the mower from the tractor and do so without protracted procedures or special equipment.

It is an object of this invention to provide a mounting for a side mounted tractor mower including an improved mechanism for raising or lowering the cutting element without objectionably varying the pivotal attitude of the cutting element with respect to the ground.

It is a further object of this invention to provide a mower mounting attachment whereby the cutting mechanism can be adjusted by a single control to cut over parallel surfaces of varying heights.

It is a further object to provide a side mounted mower attachment that can be connected to a tractor by a simplified procedure.

It is a further object of this invention to provide a side mounted tractor mower that can be connected to or removed from a tractor by a single operator without the use of special tools or additional equipment.

Referring to the drawings.

Figure 1:
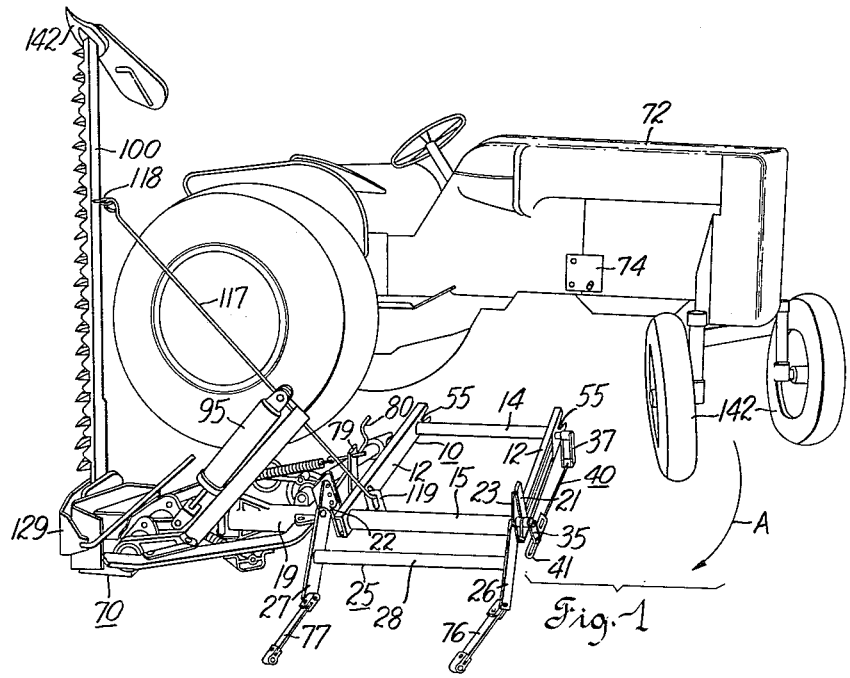
FIG. 1 shows the mower and mounting frame of this invention in the foreground and in the background a tractor in the position preliminary to mounting the mower frame.
Figure 3:
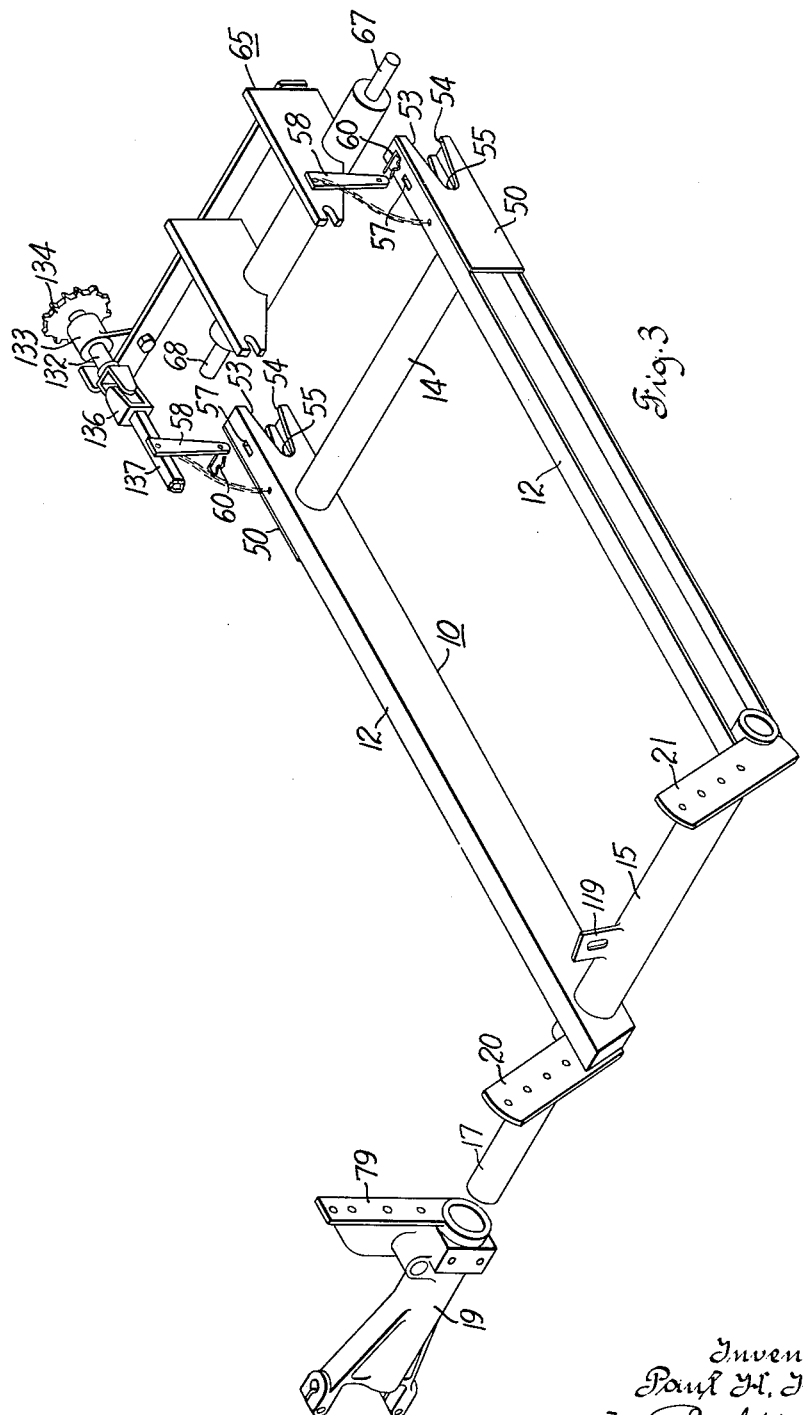
FIG. 3 is an exploded view showing the attachment frame with the mower mounting base and the tractor mounting bracket.

Referring to FIGS. 1 and 3 an elongated, rigid frame assembly or frame structure 10 is formed of a pair of longitudinally extending channels 12 with outwardly facing open sides. Rigid cross supports are provided by tubes 14 and 15 with the rearward tube 14 welded to the confronting web surfaces of the channels 12. The forward cross support tube 15 extends through the channel members and is welded thereto. Rigidly secured to and extending from one side of the forward cross support tube 15 is a main drive support shaft 17 upon which is pivotally mounted the mower mounting base 19 (FIG. 3) which in turn supports the mower assembly (FIG. 1). At either side of the front portion of the frame 10 are right and left upstanding supports 20 and 21 respectively welded to the forward tube 15 and channel members 12. To these upstanding supports 20 and 21 are respectively bolted the right hand and left hand lift brackets 22 and 23. Pivotally connected to the lift brackets is a frame lift arm assembly 25 which affords adjustable connecting means between a forward portion of the frame structure 10 and the tractor. The assembly 25 comprises left and right arms 26 and 27 respectively and a supporting cross member 28 welded at its ends to the arms 26 and 27 to form a rigid unitary structure.

Figure 4:
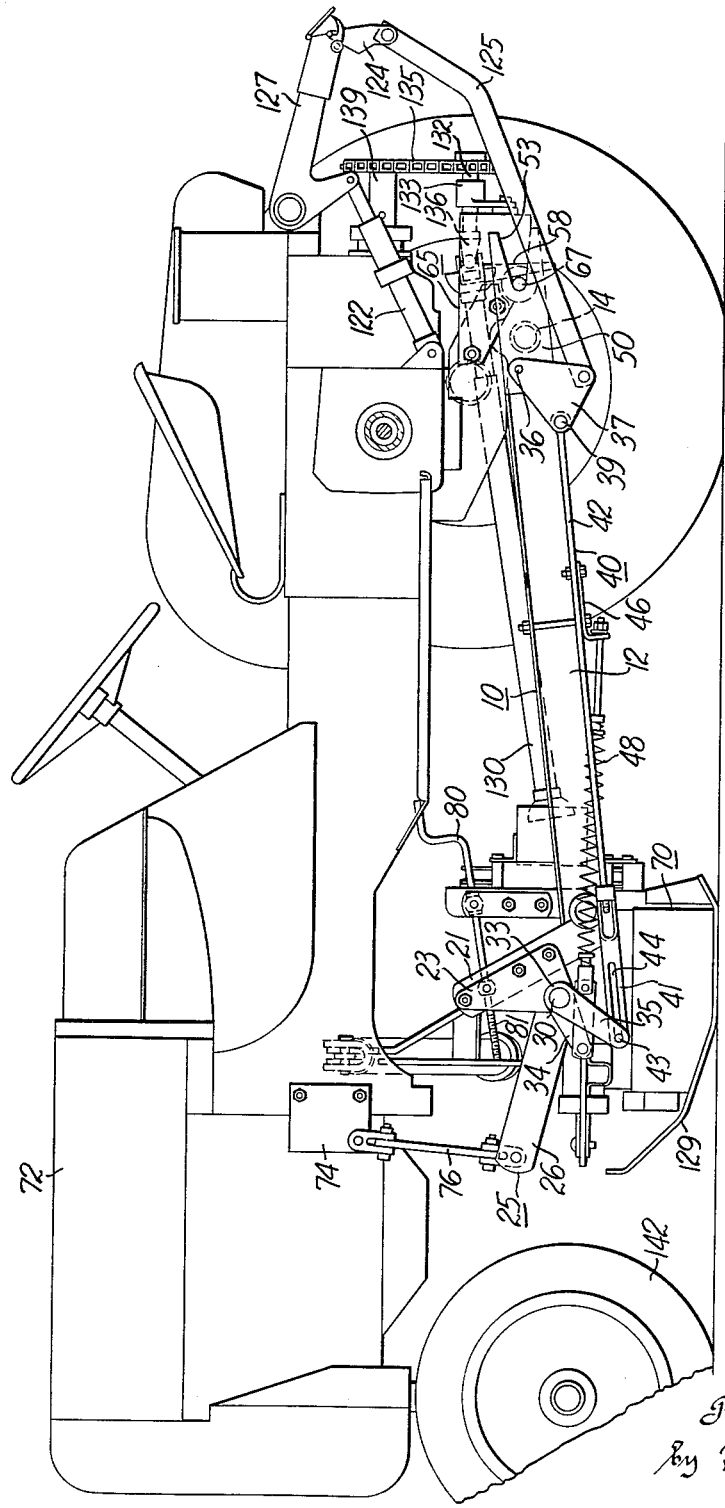
FIG. 4 is a side view of a tractor having the left rear wheel removed and a portion of the front wheels broken away showing the tractor mower mounting of this invention mounted thereon in a lowered position.

Referring now to FIG. 4, stub shaft 30 is journaled through an opening in the left lift bracket 23 and has rigidly connected to it at one end the left arm 26 of the frame lift arm assembly 25. Rigidly secured to the other end of stub shaft 30 is a hub 33 which includes as integral parts thereof the crank arms 34 and 35. The right arm 27 of the lift arm assembly 25 is pivotally connected to the right hand lift bracket 22 (FIG. 1). At a rear portion of the frame 10, a lift pivot crank shaft 36 is attached to the channel 12. To this shaft is pivotally connected a lift crank 37. A pin 39 pivotally connects the lift rod shaft portion 42 at the rearward end to the lift pivot crank 37 and a pin 43 which is free to move back and forth in the end portion slot 44 connects the forward end portion 41 to the crank arm 35.

A threaded connection between the rearward shaft portion 42 and the forward end portion 41 of the lift rod 40 affords adjustment of the effective length of the lift rod. Bracket 46 is bolted to the channel 12 of the frame 10 and interconnected between this bracket and the crank arm 34 is a counterbalancing tension spring 48.

At the rear of the frame 10 plates 50 are respectively welded to the flange portions of the channels 12 forming full channel rear sections of the frame 10. As shown in FIG. 3 in each of the vertical side plates of the full channel rear portions there are upper and lower guide surfaces 53 and 54 respectively rearwardly opening and forwardly converging which define a pair of converging planes. The forward ends of these guiding surfaces are joined by an arcuate bearing surface 55 of constant radius.

A bracket assembly 65 mounts on the tractor frame and presents a pair of transversely spaced pivot shaft portions 67 and 68 on a common axis which are spaced transversely to be received between the mounting frame guide surfaces and to fit securely in an engaged or mounted position against the curved bearing surfaces 55 that join the forwardly converging guiding surfaces 53 and 54. The pivot shafts 67 and 68 are retained in engagement with the bearing surfaces 55 by the wedge pins 58 which extend through the apertures 57 in the mounting frame and are retained in position by lock pins 60. These coaxial shaft portions 67 and 68 define a transverse axis about which the frame 10 is pivoted to raise and lower the mower assembly. Also supported by the bracket 65 is a housing 133 through which is journaled the drive shaft 132. The drive shaft 132 mounts the driven sprocket 134 on the rearward portion and by a forward portion is connected to the universal coupling 136. The opposite side of the universal coupling 136 connects with the tube 137 which has a square cross section.

In FIG. 1 the mower support frame 10 with the mower assembly 70 attached thereto is shown in the foreground while in the background is shown a tractor 72 in a position preliminary to the attachment of the mower support frame. A pair of mounting brackets 74 (one of which is visible on the right side of the tractor) are bolted to the tractor body. A pair of lift straps 76 and 77 pivotally connected at both ends interconnect a forward portion of the right and left lift arms 26 and 27 of the frame lift arm assembly 25 respectively with the brackets 74 at the right and left sides of the tractor body (the left lift straps appear in the assembled condition in FIGS. 4 and 5).

Figure 2:
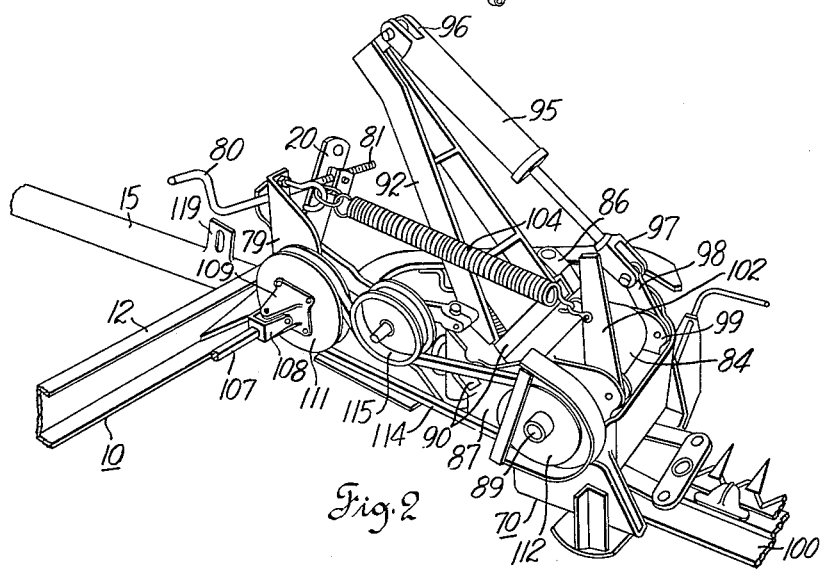
FIG. 2 shows a portion of the supporting frame on which the mower assembly is mounted with the drive shaft and cutter bar broken away.

FIGS. 1 and 2 show the mower assembly 70 mounted on the mower support frame 10. Connected to the base 19 is an upstanding angle member 79 which is adjustably connected to the right hand upstanding frame portion 20 of the support frame 10 by the tilt crank 80 which has a threaded end portion 81. The tilt crank 80 adjusts the pivotal relation of the base 19 about the supporting pivot shaft 17 in a conventional manner and will not be further described here as it forms no part of the invention of this application, except that the crank 80 retains the base 19 on the frame structure 10 for unitary swinging movement therewith about the rearward transverse axis afforded by the pivot shafts 67 and 68. A drive housing 84 provides a cutter bar support and carries a driven shaft 89. The housing or cutter bar support 84 is connected with the base 19 by a front support assembly 86 and a rear support assembly 87 for pivotal movement relative to the base 19 about the axis of the shaft 89. The front and rear support assemblies are connected to the base 19, and a cutter bar 100 is conventionally secured to the cutter bar support 84 in right angle relation to the axis of the shaft 89. A bar assembly 90 interconnects and supports the front support assembly 86 and rear support assembly 87 and intermediate the two assemblies has welded thereto a ram support assembly 92. A hydraulic ram 95 affords an adjusting means for the cutter bar support 84 and is pivotally connected at the cylinder end 96 to the ram support assembly 92 and the rod end 97 of the ram is pivotally connected to one end portion of a link 98. The opposite end portion of the link 98 is pivotally connected to the ear 99 which is an integral part of the drive housing 84. Extension and contraction of the hydraulic ram 95 swings the drive housing about the axis of the shaft 89 and thereby effects a downwardly and upwardly swinging action of the cutter bar 100 about the axis of the shaft 89. A bar lift strap 102 is rigidly connected to the drive housing 84 and is interconnected to the upstanding angle member 79 of the mounting base 19 by a balance spring 104 which serves to counterbalance the weight of the cutter bar 100 about the axis of shaft 89.

It will be noted that the cutter bar support 84 is connected with the mounting base 19 for pivotal movement therewith as a unit about the rearward transverse axis afforded by the pivot shafts 67 and 68, and that the cutter bar support 84 is in turn pivotally movable relative to the base 19 about the axis of the shaft 86 which extends longitudinally in right angle relation to the axis of the pivot shafts 67 and 68.

Shown broken away is a square shaft 107 that has its end rigidly connected to yoke member 108 which in cooperation with another yoke member 109 forms a universal joint. The square shaft 107 and the tube 137 (FIG. 3) comprise the telescopic shafting which serves to transmit power from the power take-off of the tractor to the mower mechanism. The yoke member 109 is bolted to the drive sheave 111 which is in turn journaled on the main drive pivot 19. A driven sheave 112 is keyed to the shaft 89 and tension in the belt 114 is maintained by a spring loaded tensioning idler 115.

A power train within the drive housing translates the rotation of the shaft 89 into reciprocating motion of the cutter bar 100. This mechanism is not here described in detail as it forms no part of the present invention.

In FIG. 1 the cutter bar 100 is shown in the transport position and is secured in this position by the transport rod 117 which interconnects the eye bolt 118 on the cutter bar with the apertured ear 119 on the forward cross supporting tube 15 of the mower mounting frame 10.

In FIG. 4 the mower assembly 70 and the support frame 10 are shown mounted on the tractor 72 in a lowered position. In this position the lift arm ram 122 is in a contracted position, wherein a lift link 124 and lift bar 125 which interconnect the end of the lift arm 127 with the lift pivot crank 37 permit the lift pivot crank 37 to pivot clockwise. The forward portion of the frame lift arm assembly 25 is thereby allowed to pivot upward about the axis of the stub shaft 30 due to the release of restraint of the lift rod 40 upon the crank arm 35. In this position the inner shoe 129 rests on the ground. In the condition shown in FIG. 4 the inner shoe 129 is supported by the lift rod 40 such that should a depression in the ground surface be encountered the lift rod will maintain the inner shoe at the height shown. However, should a rise in the contour of the ground be encountered the inner shoe will rise causing the crank arm 35 to pivot counterclockwise without affecting the position of the lift rod end portion 41 since this motion relative to one another will be accommodated by the lost motion provided by the pin 43 riding in the slot 44 of the lift rod end portion.

The shielding 130 for the mower drive telescopic shafting appears partially concealed. The forward square rod portion of the telescopic drive shafting connects to the drive sheave 111 on the main drive pivot 19 (FIG. 2) and the rearward tube portion of the shafting is connected by universal coupling 136 to the shaft 132 which is journaled to the mounting bracket assembly 65. Mounted on the shaft 132 is the driven sprocket 134 which is driven by the chain 135 which passes over a second sprocket mounted on the power take-off shaft 139.

Figure 5:
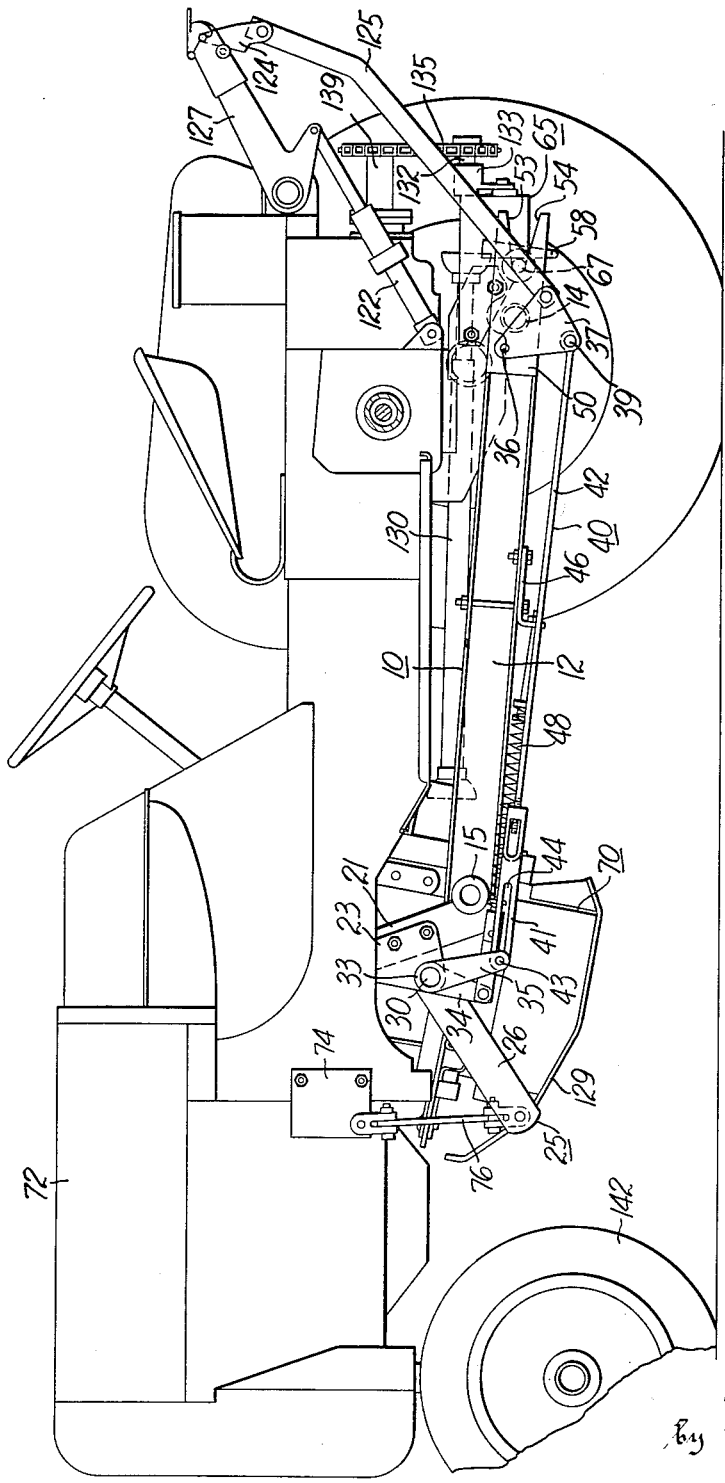
FIG. 5 is a side elevation similar to that of FIG. 4 showing the tractor mower mounting in the raised position.

FIG. 5 shows the same side view of the tractor and mower mounting as FIG. 4 with the lift arm 127 raised and the mower support frame pivoted upward about the axis of the pivot shaft portions. As the lift arm causes the lift bar 125 and connecting link 124 to turn the pivot crank 37 in a counterclockwise direction the lift rod rotates the crank arm 35 and the frame lift arm assembly 25 in a counterclockwise direction causing the forward portion of the mower support frame 10 to be raised by pivotal motion about the axis of the pivot shafts 67 and 68. The height to which the tractor lift arms 127 causes the forward portion of the mower support frame 10 to be raised may be adjusted by variation of the connection between the lift rod shaft portion 42 and the forward end portion 41 to increase or decrease the effective length of the lift rod 40.

During the operation of raising the mower assembly 70, by pivoting the mower support frame 10 about the axis of the shaft portions 67 and 68, the pivotal attitude of the cutter bar 100 around the longitudinal axis established by the shaft 89 remains unchanged so that when the inner shoe is raised the cutter bar 100 assumes an attitude substantially parallel to the initial orientation. The condition which is subject to variation by raising and lowering of the mower assembly is the tilt of the cutter bar which occurs about the axis of the pivot shafts 67 and 68; however, since the radius of rotation is so long, any alteration in the tilt of the cutter bar 100 would not be significant within the range of adjustment to which the inner shoe is subjected in operation.

To hitch the mower support frame 10 to the tractor 72, the tractor initially assumes the position shown in FIG. 1, wherein the right side of the tractor is adjacent to the rear of the mounting frame. Thereafter the front wheels 142 are turned sharply to the right and the tractor is driven forward as indicated by the arrow A which brings the tractor 72 to a position overlying the mower support frame 10. At this point the tractor can be driven forward causing the pivot shafts 67 and 68 to be confined between the guiding surfaces 53 and 54 with any necessary slight vertical adjustment of the guiding surfaces, necessitated by ground irregularities, being made by the operator, who is at this time within the reach of the swath board and grass rod attached to the outer shoe 142, allowing him to rock the frame and mower assembly. With the pivot shafts intermediate the wedging surfaces it is only necessary to move the tractor forward bringing the pivot shaft portions into engagement with the concave bearing surfaces 55 and insert the wedge pins 58 through the apertures 57 to lock the rear of the frame 10 in position. With the ram 122 collapsed the lift straps 76 and 77 may be connected to the brackets 74. There after it is only necessary to connect the telescopic drive shaft and hydraulic line (not shown) which serves the hydraulic ram 95.

While in the foregoing a preferred embodiment of the invention has been disclosed it should be understood that it is not intended to limit the invention to the particular terms and details described hereinabove, and that the invention includes such other forms and modifications as are embraced by the scope of the appended claims.

What is claimed is:

1. A mower mounting for a tractor having a wheeled front support and a pair of transversely spaced rear ground engaging wheels comprising: a rigid frame structure adapted to extend lengthwise in a forward direction from the space between said tractor rear wheels and terminate at its forward end to the rear of said tractor front support, pivot means at a rearward portion of said frame structure for connecting the latter to said tractor about a rearward transverse axis; adjustable connecting means at a forward portion of said frame structure for connecting the latter to said tractor in different positions of pivotal adjustment about said transverse axis; and a mower mechanism mounted at one side of said frame structure and extending laterally outward from a forward portion thereof, said mower mechanism including a mounting base fixedly connected with a forward portion of said frame structure and pivotally movable therewith as a unit about said rearward transverse axis; a cutter bar support connected with said mounting base for movement in unison therewith about said rearward transverse axis and for pivotal movement relative to said mounting base on a longitudinal hinge axis extending in right angle relation to said rearward transverse axis; a cutter bar secured to said cutter bar support in right angle relation to said longitudinal axis; and adjusting means connected to said frame structure and said cutter bar support for selectively positioning said cutter bar about said hinge axis.

2. A moving machine comprising: a tractor having a wheeled front support and a pair of spaced rear ground engaging wheels on a common transverse axis; a rigid frame structure extending lengthwise in a forward direction from the space between said tractor rear wheels and terminating at its forward end to the rear of said tractor front support; a mounting bracket attached to said tractor and presenting pivot means on a rearward transverse axis; connecting means at a rearward portion of said frame structure in cooperative engagement with said mounting bracket so as to support said frame structure for swinging movement about said rearward transverse axis; adjustable connecting means operatively interposed between forward portions of said tractor and frame structure for raising and lowering the latter to different positions of pivotal adjustment about said rearward transverse axis; and a mower mechanism mounted at one side of said frame structure and extending laterally outward from a forward portion thereof, said mower mechanism including a mounting base fixedly connected with a forward portion of said frame structure and pivotally movable therewith as a unit about said rearward transverse axis; a cutter bar support connected with said mounting base for movement in unison therewith about said rearward transverse axis and for pivotal movement relative to said mounting base on a longitudinal hinge axis extending in right angle relation to said rearward transverse axis; a cutter bar secured to said cutter bar support in right angle relation to said longitudinal axis; and adjusting means connected to said frame structure and said cutter bar support for selectively positioning said cutter bar about said hinge axis.

3. In a mowing machine, the combination of a tractor having rear ground engaging wheels on a common axis and a dirigible front wheel structure; an elongated, rigid frame assembly; connecting means between rearward portions of said tractor and frame assembly operative to support said frame assembly on said tractor for up and down swinging movement about a transverse axis; a mower mounting base fixedly connected with a forward portion of said frame assembly for movement in unison therewith about said transverse axis; a cutter bar support connected with said mower mounting base for movement in unison therewith about said rearward transverse axis and for pivotal movement relative to said mounting base on a longitudinal axis extending in right angle relation to said transverse axis; a cutter bar secured to said cutter bar support in right angle relation to said longitudinal axis; adjusting means interconnecting said cutter bar support and said frame assembly for selectively positioning said cutter bar about said longitudinal axis; and adjusting means connected to said frame assembly and said tractor for selectively positioning said frame assembly about said transverse axis.

4. The combination set forth in claim 3 wherein said connecting means comprises: a rear portion of said frame assembly presenting a pair of transversely spaced concave surfaces which terminate in rearwardly diverging guide surfaces; a pair of transversely spaced cooperating pivot shaft portions connected to said tractor and engageable with and disengageable from said concave surfaces; and releasable locking means for retaining said concave surfaces in pivotal engagement with said pivot shaft portions.

References Cited in the file of this patent

UNITED STATES PATENTS

| | | |
|---|---|---|
| 2,232,823 | Lull | Feb. 25, 1941 |
| 2,485,383 | Hoyt | Oct. 18, 1949 |
| 2,862,343 | Wood | Dec. 2, 1958 |